(12) United States Patent
Qin et al.

(10) Patent No.: US 12,487,669 B2
(45) Date of Patent: Dec. 2, 2025

(54) EYE MODEL ENROLLMENT

(71) Applicant: Apple Inc., Cupertino, CA (US)

(72) Inventors: Hao Qin, Mountain View, CA (US);
Hua Gao, Cupertino, CA (US); Tom Sengelaub, San Francisco, CA (US);
Chia-Yin Tsai, Santa Clara, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 18/568,256

(22) PCT Filed: Jun. 8, 2022

(86) PCT No.: PCT/US2022/032670
§ 371 (c)(1),
(2) Date: Dec. 7, 2023

(87) PCT Pub. No.: WO2022/261205
PCT Pub. Date: Dec. 15, 2022

(65) Prior Publication Data
US 2024/0272709 A1    Aug. 15, 2024

Related U.S. Application Data

(60) Provisional application No. 63/209,883, filed on Jun. 11, 2021.

(51) Int. Cl.
G06F 3/01       (2006.01)
(52) U.S. Cl.
CPC .................................. G06F 3/013 (2013.01)
(58) Field of Classification Search
CPC ....................................................... G06F 3/013

USPC ........................................................... 345/156
See application file for complete search history.

(56) References Cited

U.S. PATENT DOCUMENTS

| | | | |
|---|---|---|---|
| 7,986,816 B1* | 7/2011 | Hoanca | G06V 40/18 |
| | | | 382/280 |
| 2019/0101978 A1* | 4/2019 | Iseringhausen | G02B 27/017 |
| 2020/0089315 A1* | 3/2020 | Stent | H04N 23/11 |
| 2020/0257359 A1* | 8/2020 | Klingström | G06T 7/62 |
| 2021/0106220 A1* | 4/2021 | Abou Shousha | A61B 3/14 |

OTHER PUBLICATIONS

International Search Report and Written Opinion from PCT/US2022/032670, Sep. 29, 2022, pp. 1-12.

\* cited by examiner

*Primary Examiner* — Mark Edwards
(74) *Attorney, Agent, or Firm* — Alexander A. Knapp; Kowert, Hood, Munyon, Rankin & Goetzel, P.C.

(57) ABSTRACT

Methods and apparatus for generating user-aware eye models. During an enrollment process, images of a user's eye are captured by one or more cameras when the eye is in two or more different orientations and at two or more different levels of display brightness. The captured images are processed to generate a 3-dimensional, user-aware eye model, for example a model of at least the eye's cornea and pupil features. The generated user-aware eye model may be used in other processes, for example in a gaze tracking process. The enrollment process may be an iterative process to optimize the eye model, or a continuous process performed while the user is using the system.

20 Claims, 14 Drawing Sheets

EYE MODEL ENROLLMENT

PRIORITY APPLICATION

This application is a 371 of PCT Application No. PCT/US2022/032670, filed Jun. 8, 2022, which claims benefit of priority to U.S. Provisional Patent Application No. 63/209,883, filed Jun. 11, 2021. The above applications are incorporated herein by reference. To the extent that any material in the incorporated application conflicts with material expressly set forth herein, the material expressly set forth herein controls.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye or gaze tracker is a device for estimating eye positions and eye movement. Eye or gaze tracking processes and systems have been used in research on the visual system, in psychology, psycholinguistics, marketing, and as input devices for human-computer interaction. In the latter application, typically the intersection of a person's point of gaze with a desktop monitor is considered. An eye model is a mathematical representation of a human eye that may be used in processes and systems including but not limited to gaze tracking processes and systems.

SUMMARY

Embodiments of methods and apparatus for user eye enrollment are described. An imaging system may include two or more illumination sources (e.g., point light sources such as light-emitting diodes (LEDs)) that illuminate a person's eye or eye region, and at least one camera configured to capture images of light from the illumination sources reflected by the eye when illuminated. In embodiments, images of the eye captured when the eye is in two or more different orientations and with two or more different levels of display brightness may be processed to generate an eye model, for example a model of the eye's cornea and pupil features. The images may be captured and processed to generate an eye model during an enrollment process for a device such as a head-mounted device (HMD). In some embodiments, the enrollment process may be performed as an initial process when the device is used by the user, for example when the user places the HMD on their head. Alternatively, the enrollment process may be a continuous or iterative process that constructs and improves the eye model as the user is using the device.

In embodiments, an eye model specific to a user (which may be referred to as a user-aware eye model) is constructed from images of the user's eyes captured during the enrollment process. A stimulus or guide may be displayed on a display to cause the user to look in different directions. Brightness of the display, or other display characteristics, may be modulated to stimulate different pupil responses. Images of the user's eye are captured at two or more different orientations and at two or more levels of brightness by one or more eye cameras. From these images the system estimates eye features, for example a cornea surface model and a dynamic pupil model which is a function of pupil radius, for the user's eye. This modeling may be performed for one eye, or for both eyes. The method may iterate to optimize the eye model.

Figure 1A:
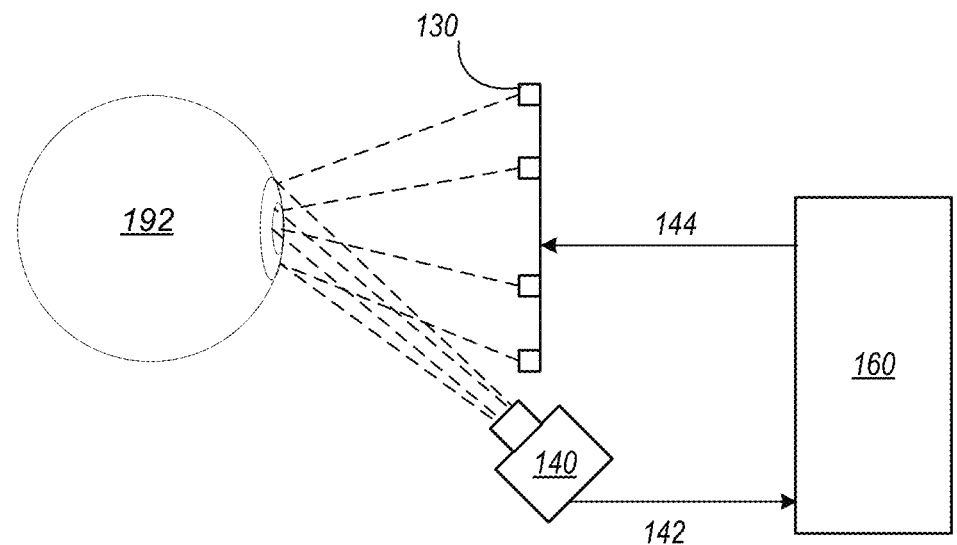
FIGS. 1A through 1F illustrate example eye camera systems, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for user eye enrollment are described. An imaging system as described herein may include two or more illumination sources (e.g., point light sources such as light-emitting diodes (LEDs)) that illuminate a person's eye or eye region, and at least one camera configured to capture images of light from the illumination sources reflected by the eye when illuminated. Images of the eye captured when the eye is in two or more different orientations and with two or more different levels of display brightness may be processed by a controller to generate an eye model, for example a model of the eye's cornea and pupil features. The images may be captured and processed to generate an eye model during an enrollment process for a device such as a head-mounted device (HMD). In some embodiments, the enrollment process may be performed as an initial process when the device is used by the user, for example when the user places the HMD on their head. Alternatively, the enrollment process may be a continuous or iterative process that constructs and improves the eye model as the user is using the device.

Embodiments of methods and apparatus for user eye enrollment as described herein may, for example, be used in head-mounted devices (HMD), for example HMDs of computer-generated reality (XR) systems such as a mixed or augmented reality (MR) systems or virtual reality (VR) systems. In conventional systems, a generic human eye model is typically used as a base. In embodiments, instead of using a generic human eye model, an eye model specific to a user (which may be referred to as a user-aware eye model) is constructed from images of the user's eyes captured during the enrollment process. Further, while some embodiments may use ground truth targets during the enrollment process to guide the user and construct the eye model, embodiments are described in which user-aware eye models may be constructed without using ground truth targets. Removing the dependency on ground truth targets may provide a better user experience, and also provides more freedom for system designers.

In embodiments, the user puts on a device (e.g., an HMD). A stimulus or guide may be displayed on the display to cause the user to look in different directions. Brightness of the display, or other display characteristics, may be modulated to stimulate different pupil responses. Images of the user's eye are captured at two or more different orientations and at two or more levels of brightness by one or more eye cameras. From these images the system estimates a cornea surface model and a dynamic pupil model, which is a function of pupil radius, for the user's eye. This modeling may be performed for one eye, or for both eyes.

An example use for embodiments of the user-aware eye models generated in the enrollment process is in gaze tracking. A gaze tracking system may, for example, be used to compute gaze direction and a visual axis using glints and eye features based on the three-dimensional (3D) geometric model of the eye. As another example, the eye model generated by the enrollment process may be used for biometric authentication that uses features of the user's eyes such as the iris, cornea, and pupil, the eye region (referred to as the periocular region), or other parts of the user's face such as the eyebrows to authenticate the user. Embodiments of the user-aware eye models generated in an enrollment process as described herein may be used in a gaze tracking process, a biometric authentic process, or both. Another example is in anti-spoofing, which is related to biometric authentication in that "spoofing" refers to attempts to trick a biometric authentication system by, for example, presenting a picture or model of a valid user's eye, eye region, or face. More generally, embodiments of the enrollment process and the eye models generated in the enrollment process as described herein may be used in any application or system in which models of a user's eyes are used.

A non-limiting example application of the methods and apparatus for enrollment are in devices that include an imaging system with at least one eye camera (e.g., infrared (IR) cameras) positioned at each side of a user's face, and an illumination source (e.g., point light sources such as an array or ring of IR light-emitting diodes (LEDs)) that emit light towards the user's eyes. The imaging system may, for example, be a component of a head-mounted device (HMD), for example a HMD of a computer-generated reality (XR) system such as a mixed or augmented reality (MR) system or virtual reality (VR) system. The HMD may, for example be implemented as a pair of glasses, googles, or helmet. Other example applications for the imaging system include mobile devices such as smartphones, pad or tablet devices, desktop computers, and notebook computers, as well as stand-alone systems mounted on walls or otherwise located in rooms or on buildings. In any of these example systems, the imaging system may be used for gaze tracking, biometric authentication, both, or for other applications.

Figure 1B:
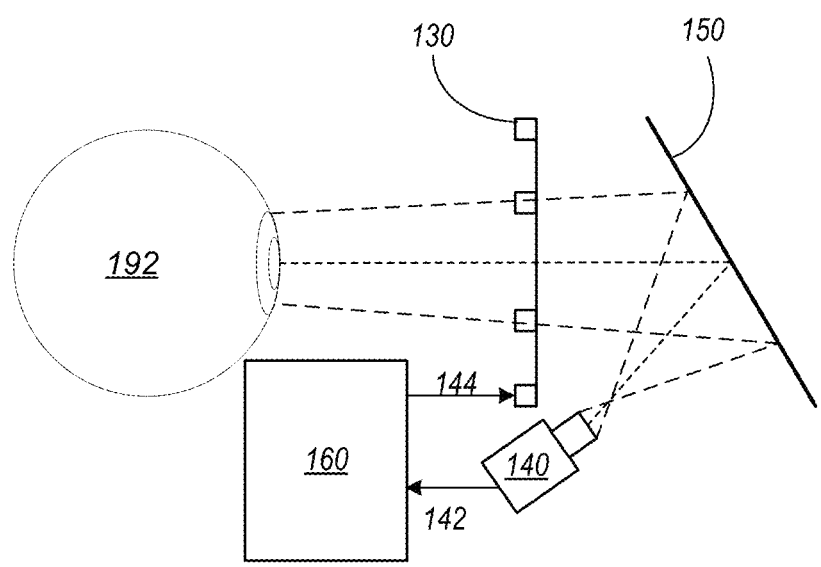
Figure 1C:
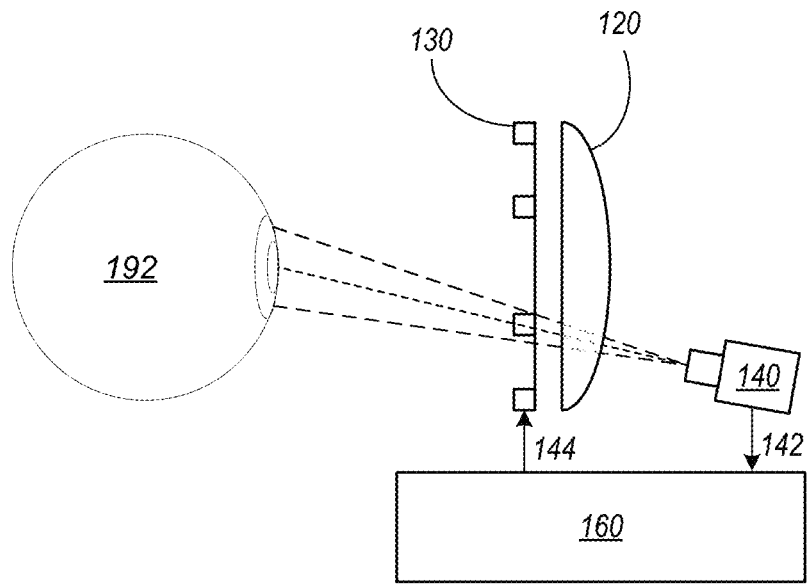

FIGS. 1A through 1F illustrate example imaging systems, according to some embodiments. An imaging system may include, but is not limited to, one or more cameras 140, an illumination source 130, and a controller 160. FIG. 1A shows an imaging system in which the eye camera 140 images the eye 192 directly. However, in some embodiments the eye camera 140 may instead image a reflection of the eye 192 off of a hot mirror 150 as shown in FIG. 1B. In addition, in some embodiments, the eye camera 140 may image the eye through a lens 120 of an imaging system, for example as shown in FIG. 1C.

Figure 1D:
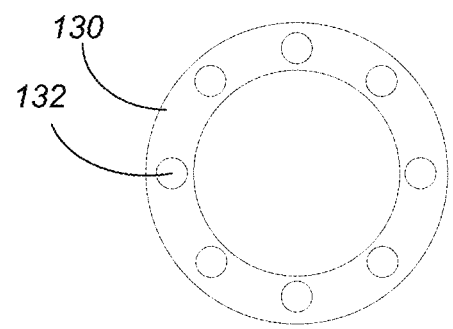

In some embodiments, a device (e.g., a head-mounted device (HMD)) may include an imaging system that includes at least one eye camera 140 (e.g., visible light and/or infrared (IR) cameras) positioned on one side or at each side of the user's face, and an illumination source 130 (e.g., point light sources such as an array or ring of IR light-emitting diodes (LEDs)) that emits light towards the user's eye(s) 192 or periorbital region. FIG. 1D shows an example illumination source 130 that includes multiple LEDs 132. In this example, there are eight LEDs 132 arranged in a ring. Note, however, that the number and arrangement of the LEDS 132 in an illumination source 130 may be different. In addition, in some embodiments other light-emitting elements than LEDs may be used. In some embodiments, the LEDs 132 may be configured to emit light in the IR or NIR range, for example at 740, 750, 840, 850, 940, or 950 nanometers.

Figure 1E:
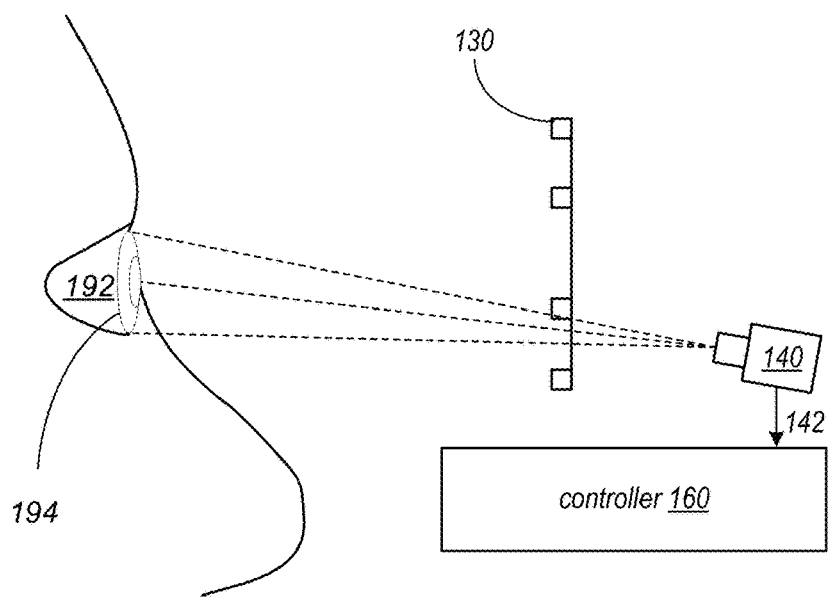
Figure 1F:
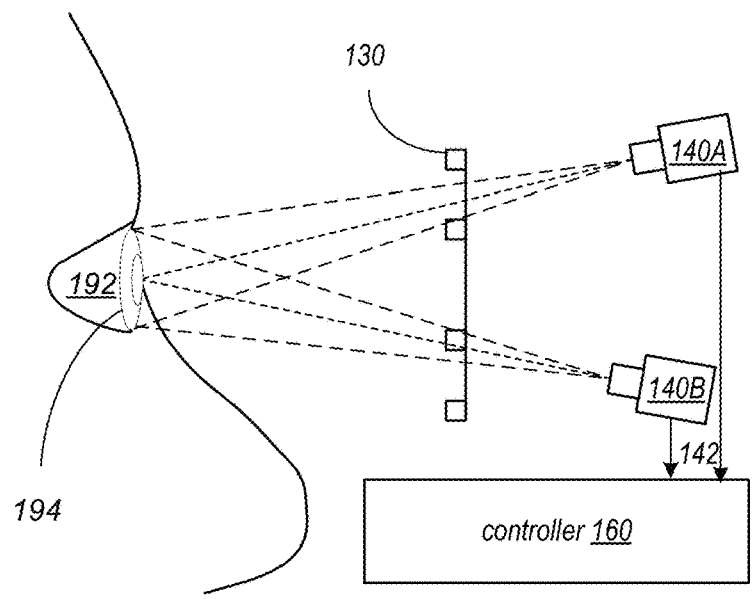

In embodiments, an eye camera 140 may be pointed towards the eye 192 to receive light from the illumination source 130 reflected from the eye 192, as shown in FIG. 1A. However, in some embodiments the eye camera 140 may instead image a reflection of the eye 192 off of a hot mirror 150 as shown in FIG. 1B. In addition, in some embodiments, the eye camera 140 may image the eye 192 through a lens 120 or other optical element of the device, for example as shown in FIG. 1C. Some embodiments may include a single camera 140 that captures images of a user's eye 192, as illustrated in FIG. 1E. Some embodiments may include two or more cameras 140 that capture images of a user's eye 192, as illustrated in FIG. 1F.

The device that includes an imaging system as illustrated in FIGS. 1A through IF may include a controller 160 comprising one or more processors and memory. Controller 160 may include one or more of various types of processors, image signal processors (ISPs), graphics processing units (GPUs), coder/decoders (codecs), and/or other components for processing and rendering video and/or images. In some embodiments, the controller 160 may be integrated in the device. In some embodiments, at least some of the functionality of the controller 160 may be implemented by an external device coupled to the device by a wired or wireless connection. While not shown in FIGS. 1A through IF, in some embodiments, controller 160 may be coupled to an external memory for storing and reading data and/or software.

The controller 160 may send control signals 144 to the illumination source 130 and camera(s) 140 to control the illumination of the eye 192 and to capture images of the eye 192 and iris 194. The controller 160 may use the images 142 of the eyes 192 captured by the eye camera(s) 140 during an enrollment process to construct or adjust a 3D model of the eye 192. The eye model may then be used for one or more purposes. For example, the controller 160 may implement gaze tracking algorithms that estimate the user's gaze direction based on additional images 142 captured by the camera (s) and the eye model generated during the enrollment process. A gaze tracking algorithm may, for example, process images 142 captured by the cameras 140 to identify glints (reflections of the LEDs 132) obtained from the eye cameras 140, pupil position and diameter, or other features of the eyes, and apply this information to the eye model to determine and track the direction in which the user is currently looking (the gaze direction).

Enrollment Processes

Figure 8:
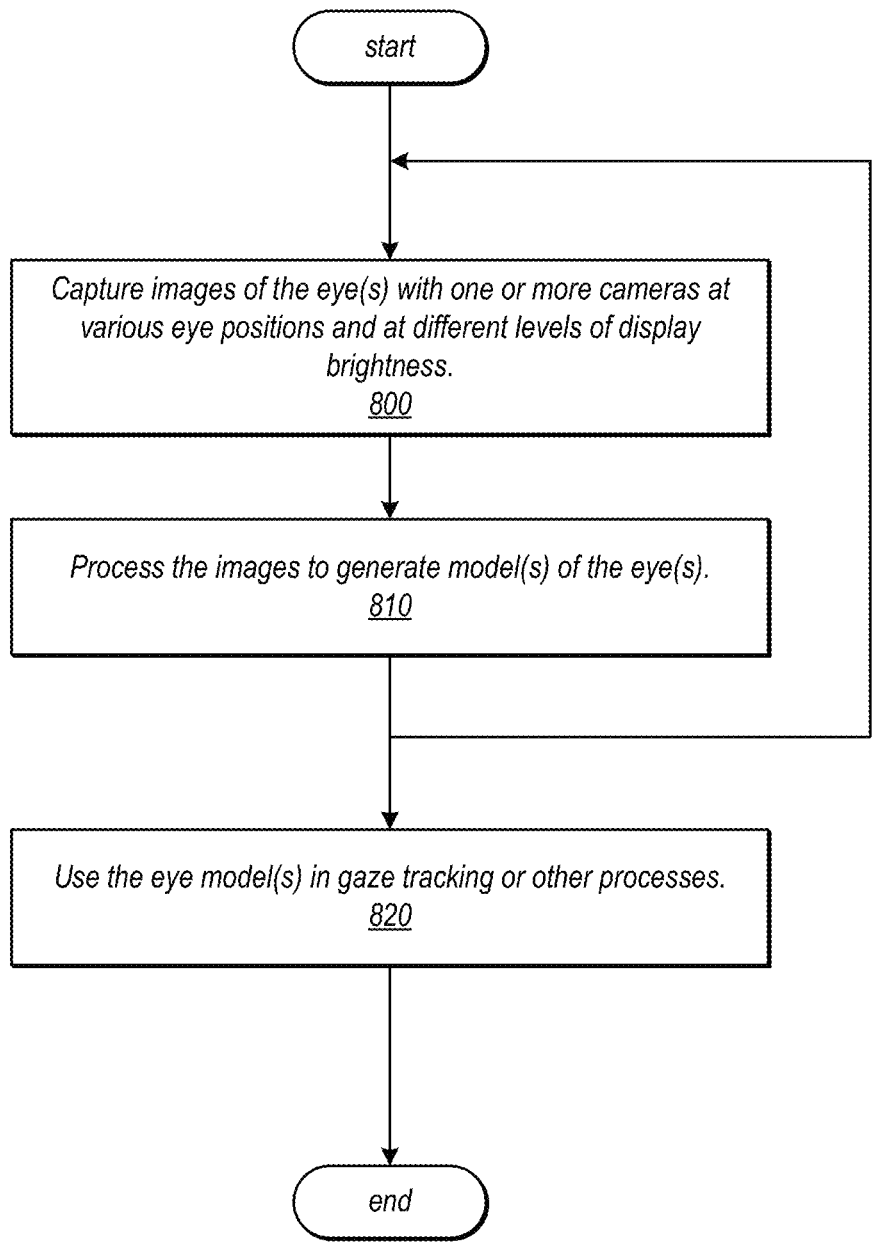
FIG. 8 is a high-level flowchart of an enrollment method, according to some embodiments.

Embodiments of user eye model enrollment methods, and systems that implement the enrollment methods, are described. FIG. 8 is a high-level flowchart of an enrollment method, according to some embodiments. In embodiments, during an enrollment process, images of a user's eye are captured by one or more cameras when the eye is in two or more different orientations and at two or more different levels of display brightness, as indicated at 800. As indicated at 810, the captured images are processed by a controller to generate a 3-dimensional, user-aware eye model, for example a model of at least the eye's cornea and pupil features. As indicated at 820, the generated user-aware eye model may be used in other processes, for example in a gaze tracking process. Embodiments may be used to generate an eye model for one eye, or for both eyes. As indicated by the arrow returning from 810 to 800, in some embodiments the enrollment process may be an iterative process or a continuous process performed while the user is using the system (e.g., an HMD). Note that the generated eye model(s) may be stored and used in the future, for example when the particular user puts on or uses the device again. Further, separate, user-aware eye models may be generated for two or more different users of a device.

Embodiments of the enrollment process may perform a physiologically accurate reconstruction of the cornea surface, and may also perform dynamic pupil modeling, when constructing a user-aware eye model. The pupil, as it contracts and dilates, moves in multiple degrees of freedom. Dynamic pupil modeling captures and processes the user's pupil across those degrees of freedom. The enrollment process modulates brightness to stimulate changes in pupil diameter. Thus, a mathematical representation of the cornea surface and a dynamic model of the pupil are captured in the user-aware eye model generated by the enrollment process. By reconstructing an accurate representation of the cornea surface as well as dynamic pupil behavior of a particular user to generate a user-aware eye model, the enrollment process may increase accuracy in processes such as gaze tracking that use the eye model when compared to conventional systems that use a generic "one size fits all" eye model.

Embodiments of the enrollment process may prompt the user to look in different directions when capturing images of the eye. From each captured image, a set of features, e.g. lens and pupil contour, may be derived. Prompting the user to look in different directions may provide good coverage of the contour of the eye. The pupil can move in many degrees of freedom, and thus display brightness is changed so that the process can observe those states and regress to generate a pupil model.

User-aware eye models may be generated during an enrollment process for a device such as a head-mounted device (HMD). In some embodiments, the enrollment process may be performed as an initial process when the device is used by the user, for example when the user places the HMD on their head. Alternatively, the enrollment process may be a continuous or iterative process that constructs and improves the eye model as the user is using the device.

Embodiments of eye model enrollment methods that use two different approaches to generate the user eye model are described. In a first method, an initial eye model, which may be a generic one, is input. The user is prompted to look at target locations (corresponding to poses) at which images of the eye are captured, in some embodiments at different levels of display brightness. The method then finds an optimal eyeball center so that the features that are constructed or calculated from a pose matches features collected from the respective image. An updated eye model is constructed. The updated eye model may be tested, and if not satisfactory (e.g., if an error rate is above a threshold) the updated eye model may be input to the beginning of the method for optimization. In a second method, an initial eye model is not used. Instead, multiple iterations of capturing and processing images at different locations (and at different levels of display brightness) are performed. In a first iteration, an eyeball center is estimated from a set of captured eye poses, and an initial user-aware eye model is constructed. The eye model is then tested, for example using the eye model in a gaze tracking process. If the eye model is not satisfactory, for example f the error rate of the process when the eye model is used in the process is above a threshold, another iteration of capturing and processing eye poses to optimize the eye model is performed. These iterations may continue until the error rate is below the threshold.

Embodiments capture images of the user's eye(s). Based on a current version of the eye model, the cornea features and pupil positions are calculated. Those calculated features are then compared to what can actually be derived from captured images of the eye to determine how far off the model is; the model can then be updated based on the comparison.

In embodiments, eye poses may be calculated using a combination of information obtained from images captured by the eye cameras and existing eye models to determine the features being tracked. Eye poses are selected that give the best match of features. The eye model parameters are fixed, and then an eye pose (e.g., with 5 DoF) is estimated.

The eye poses are used to align features to a local system. A goal is to generate a rigid eye model given a local system. Because what is observed in the eye images are features in a world system, those features need to be aligned to the local system. Once an eye pose is obtained, the eye instances from different gaze directions can be aligned. From that, the cornea surface and pupil models can be optimized.

Eye pose refers to the position and orientation of an eye. However, the eye model indicates, at a given pose, what features of the eye, e.g. cornea contour and pupil shape, would be apparent from the perspective of the eye camera at that pose.

The eye camera system may include active illumination (e.g., from LEDs as illustrated in FIGS. 1A-1F), from which reflections on the cornea surface can be observed. Refracted pupil contour can also be observed. Light reflections, observations of the points that the light is reflected on the surface of the eye, varies based on eye pose. The eye pose may thus be derived from the position of reflections or glints produced by the active illumination LEDs, and also from the pupil contour.

Embodiments of methods and apparatus for user eye enrollment as described herein may, for example, be used in HMDs of computer-generated reality (XR) systems such as a mixed or augmented reality (MR) systems or virtual reality (VR) systems. In conventional systems, a generic human eye model is typically used as a base. In embodiments, instead of using a generic human eye model, a user-aware eye model is constructed from images of the user's eyes captured during the enrollment process.

In some embodiments, ground truth targets may be used during the enrollment process to guide the user and construct the eye model. However, embodiments are described in which user-aware eye models may be constructed without using ground truth targets. Removing the dependency on ground truth targets may provide a better user experience, and also provides more freedom for system designers.

A system that implements the user eye model enrollment methods may include, but is not limited to, at least one eye camera (e.g., an infrared (IR) or near-infrared (NIR) camera, an RGB or RGB-D camera, etc.), an illumination source that includes light-emitting elements (e.g., IR or NIR LEDs, or LEDs in other wavelengths), a controller, and a display. Embodiments of the user eye model enrollment methods may, for example, be implemented using any of the systems as illustrated in FIGS. 1A through 1F. FIGS. 9A through 11 illustrate example devices and systems that may implement embodiments of the user eye model enrollment methods.

Figure 2:
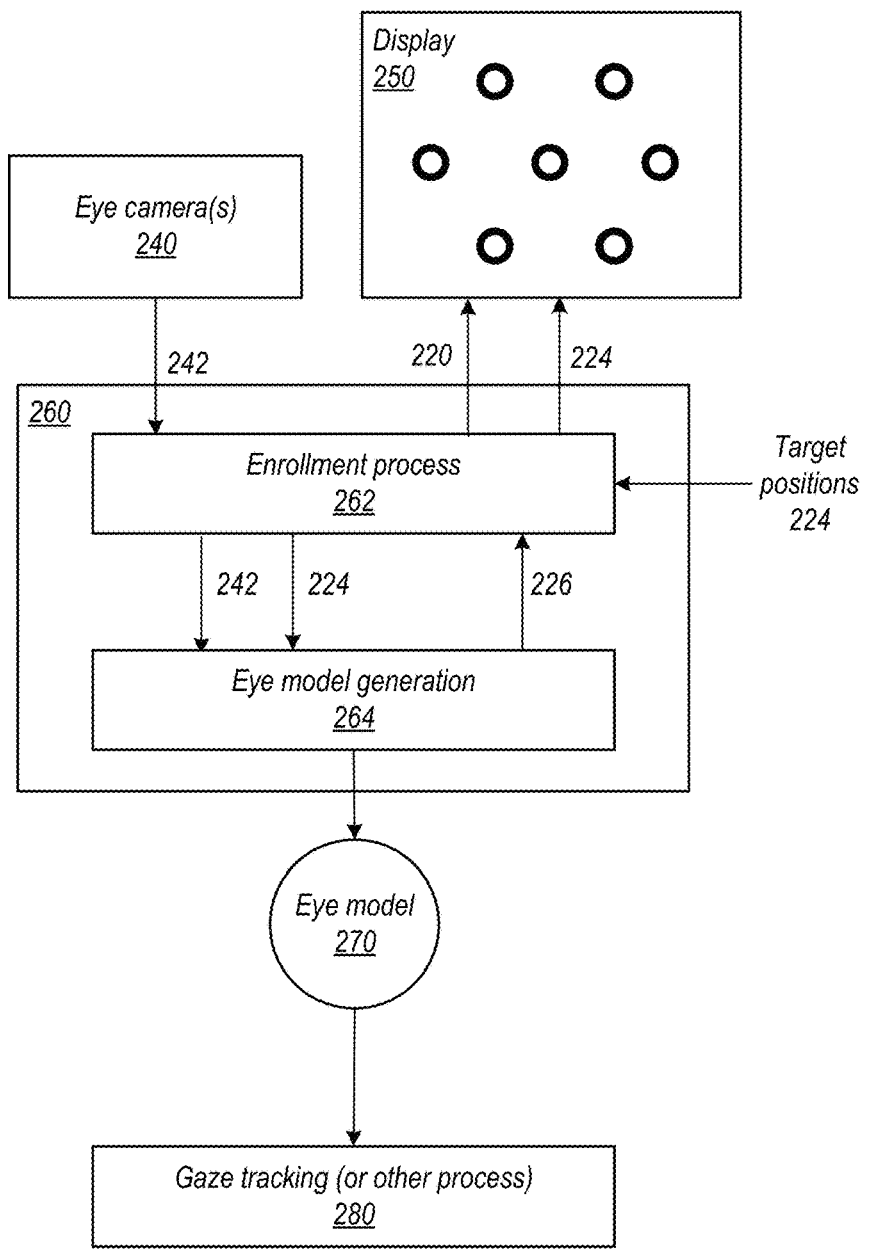
FIG. 2 illustrates an enrollment process that uses ground truth target positions, according to some embodiments.

FIG. 2 illustrates an enrollment process that uses ground truth target positions, according to some embodiments. In this enrollment process, a user is shown a series of targets that are at known positions, and eye images are captured when the user is looking at the different target positions. The captured images are analyzed to construct a model of the user's eyes. A device or system may include a controller 260, a display 250, and one or more eye cameras 240. An enrollment process 262 executing on the controller 260 causes two or more target positions 224 to be displayed on the display 250 (represented by the circles on display 250). The enrollment process [260] 262 may also modulate 220 the brightness of the display 250 at various positions 224 based on eye model generation feedback 226. As the user moves their eyes to the target positions 224, eye camera(s) 240 capture images 242 of the user's eye(s) at the target positions 224 and at different levels of brightness. The images 242 and associated target positions 224 are provided to an eye model generation 264 process, which generates an eye model 270 from the captured images 242 and associated target positions 224. The eye model 270 may then be used in a gaze tracking 280 process or some other process.

Figure 3:
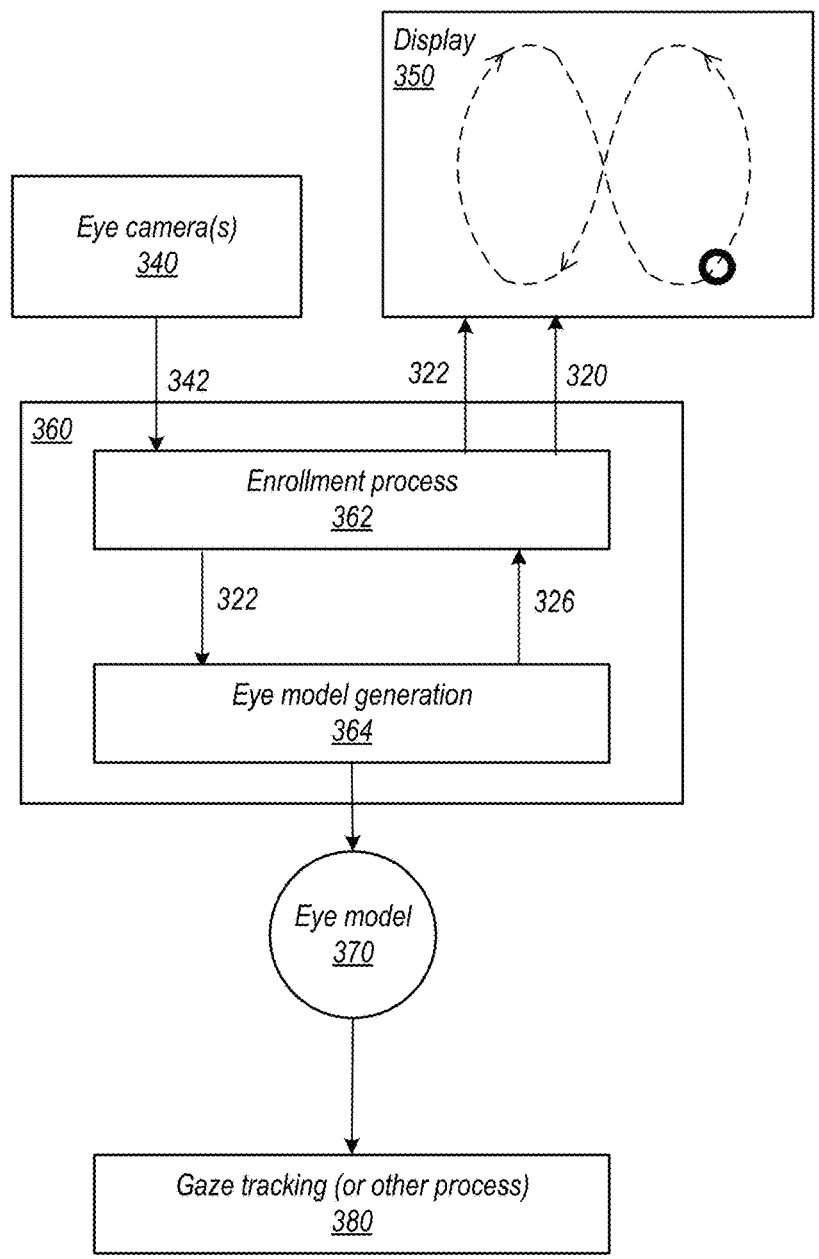
FIG. 3 illustrates an enrollment process that does not use ground truth target positions, according to some embodiments.

FIG. 3 illustrates an enrollment process that does not use ground truth target positions, according to some embodiments. In this enrollment process, a user may be shown a moving target to guide the user to look in different directions. Eye images are captured when the user is looking in different directions, but not at known target locations. The captured images are analyzed to construct a model of the user's eyes. A device or system may include a controller 360, a display 350, and one or more eye cameras 340. An enrollment process 362 executing on the controller 360 may, but does not necessarily, display a moving prompt 322 on display 350, represented by the circle on display 350, to guide the user's eyes to look at different locations on the display based on eye model generation feedback 326. The enrollment process 362 may also modulate 320 the brightness of the display 350. As the user moves their eyes, eye camera(s) 340 capture images 342 of the user's eye(s) in two or more different orientations and at two or more levels of brightness; however, the images are not at known target positions as in FIG. 2. The images 342 are provided to an eye model generation 364 process, which generates an eye model 370 from the captured images 342. The eye model 370 may then be used in a gaze tracking 380 process or some other process. This enrollment process does not need to know the target positions as in FIG. 2, nor does it need to know exactly where the user is looking. A moving prompt may be used to encourage the user to cover a wide range of angles to provide immediate accuracy after enrollment.

Figure 4:
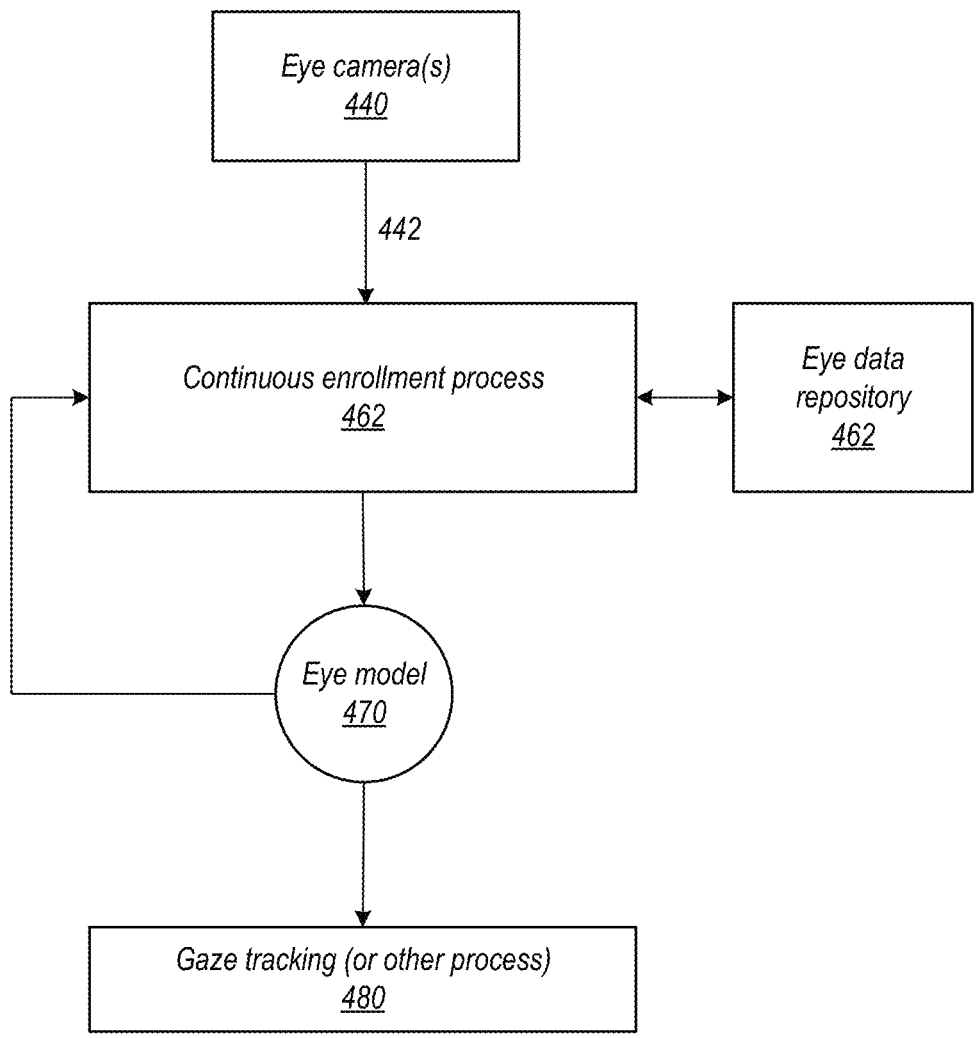
FIG. 4 illustrates a continuous enrollment process, according to some embodiments.

FIG. 4 illustrates a continuous enrollment process that does not use ground truth target positions, according to some embodiments. In this process, eye images are captured when the user is looking in different directions while using the device, but not at known target locations. The captured images are analyzed to construct and improve a model of the user's eyes. A device or system may include a controller 460, one or more eye cameras 440, and a display (not shown). As the user moves their eyes while viewing content on the display, eye camera(s) 440 capture images 442 of the user's eye(s) in two or more different orientations and at varying levels of brightness. The images 442 are provided to a continuous enrollment process 462, which generates or updates an eye model 470 from the captured images 442. The eye model 470 may be used in a gaze tracking 480 process or some other process. This enrollment process does not need to know the target positions as in FIG. 2, nor does it need to know exactly where the user is looking. However, instead of using a moving prompt as in FIG. 3, images of the eyes may be collected and processed to construct and improve an eye model as the user is using the system normally.

Figure 5A:
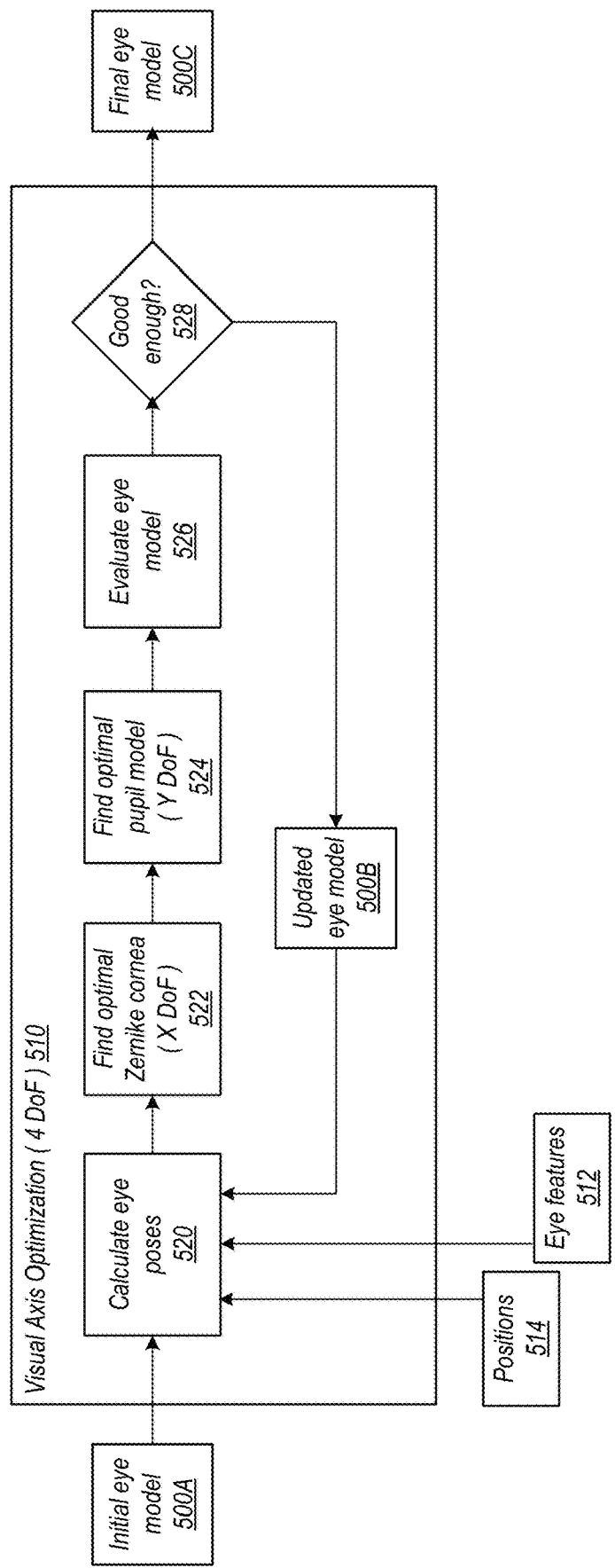
FIG. 5A further illustrates an enrollment process that uses ground truth target positions and an initial generic eye mode, according to some embodiments.

FIG. 5A further illustrates an enrollment process that uses ground truth target positions and an initial generic eye model as illustrated in FIG. 2, according to some embodiments. A single camera is used to capture images of the user's eye at different target positions and at different levels of brightness. An initial eye model 500A is input to a visual axis optimization 510 process. Eye poses are calculated 520 based on eye features 512 and positions 514 from the eye image capture process. An optimal Zernike cornea is estimated 522 in X (e.g., 16) degrees of freedom (DoF). An optimal pupil model is estimated 524 in Y (e.g., 10) DoF. The updated eye model 500B is then evaluated 526. At 528, if the evaluation of the eye model 500B determines that the eye model is sufficient, then it is output as a final eye model 500C. Otherwise, the updated eye model 500B is fed back into the calculate eye poses 520 process for further optimization.

Figure 5B:
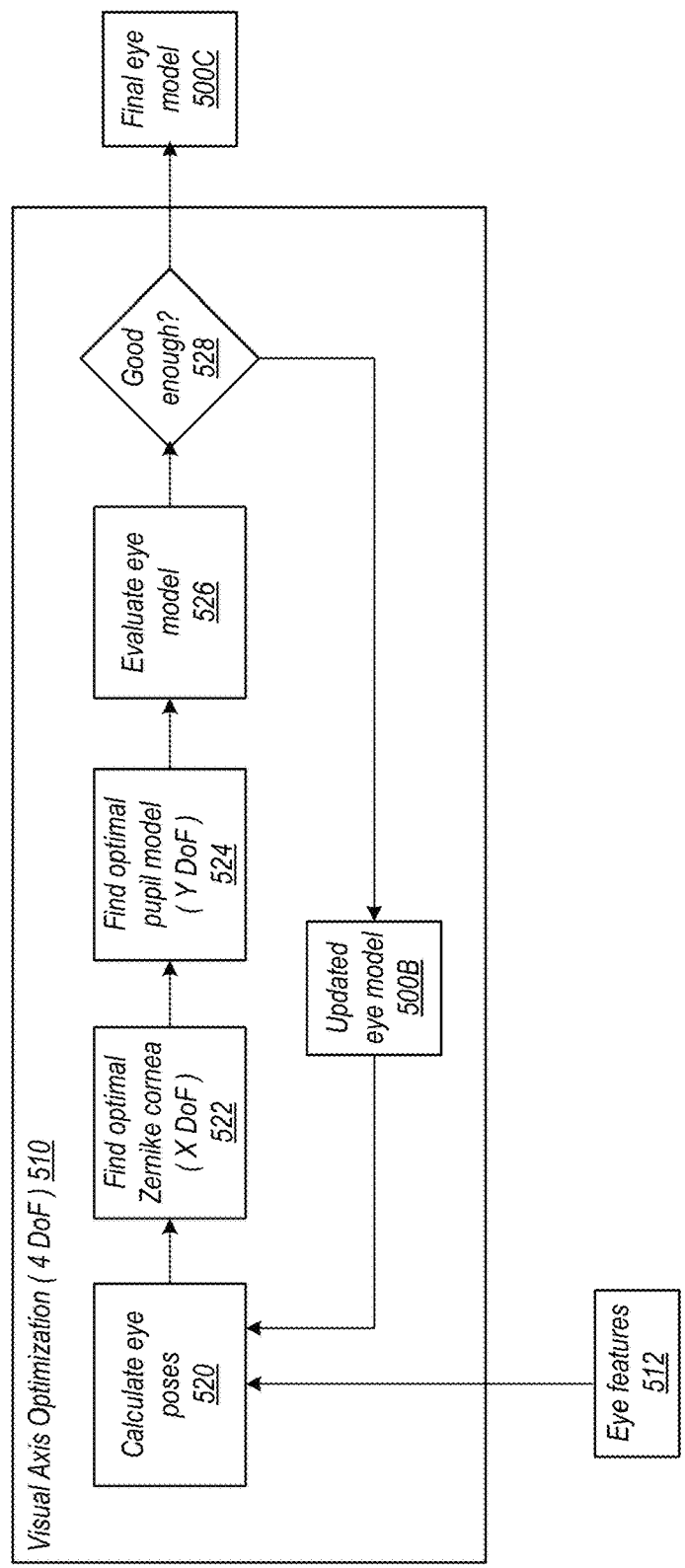
FIG. 5B further illustrates an enrollment process that does not use ground truth target positions or an initial generic eye model, according to some embodiments.

FIG. 5B further illustrates an enrollment process that does not use ground truth target positions or an initial generic eye model, according to some embodiments. One or more cameras may be used to capture images of the user's eye at different target positions and at different levels of brightness. In an initial iteration, eye poses are calculated 520 based on eye features 512 from the eye image capture process. An optimal Zernike cornea is estimated 522 in X (e.g., 16) degrees of freedom (DoF). An optimal pupil model is estimated 524 in Y (e.g., 10) DoF. The updated eye model 500B is then evaluated 526. At 528, if the evaluation of the eye model 500B determines that the eye model is sufficient, then it is output as a final eye model 500C. Otherwise, the updated eye model 500B is fed back into the calculate eye poses 520 process for further optimization.

Referring to FIGS. 5A and 5B, from the calculated eye poses, a graph system, is constructed, and then an optimizer is applied to two or more observations of the eye at different orientations to find an optimal eye pose space and eye model.

Figure 6:
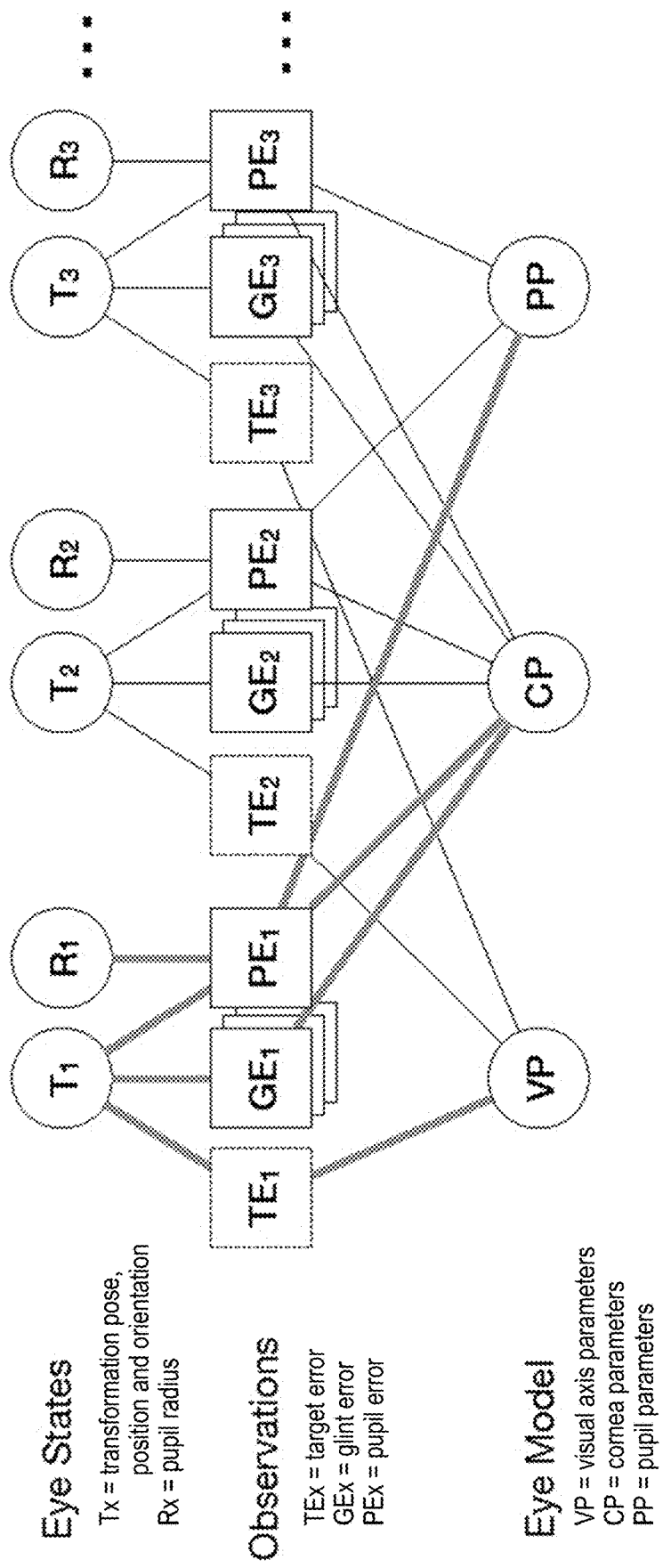
FIG. 6 is a factor graph further illustrating an enrollment process that uses ground truth target positions, according to some embodiments.

FIG. 6 is a factor graph further illustrating an enrollment process that uses ground truth target positions as illustrated in FIG. 5, according to some embodiments. A single camera may be used to capture images of the user's eye at different target positions and at different levels of brightness. The top row of circles represent eye states, with Tx representing transformation pose, position and orientation and Rx representing pupil radius for a given eye image (observation). The row of rectangles represent observations, with TEx representing target (position) error, GEx representing glint error, and PEx representing pupil error for a given observation. The bottom row of circles represent the eye model, with VP representing visual axis parameters (derived from the target positions), CP representing cornea parameters, and PP representing pupil parameters.

Figure 7:
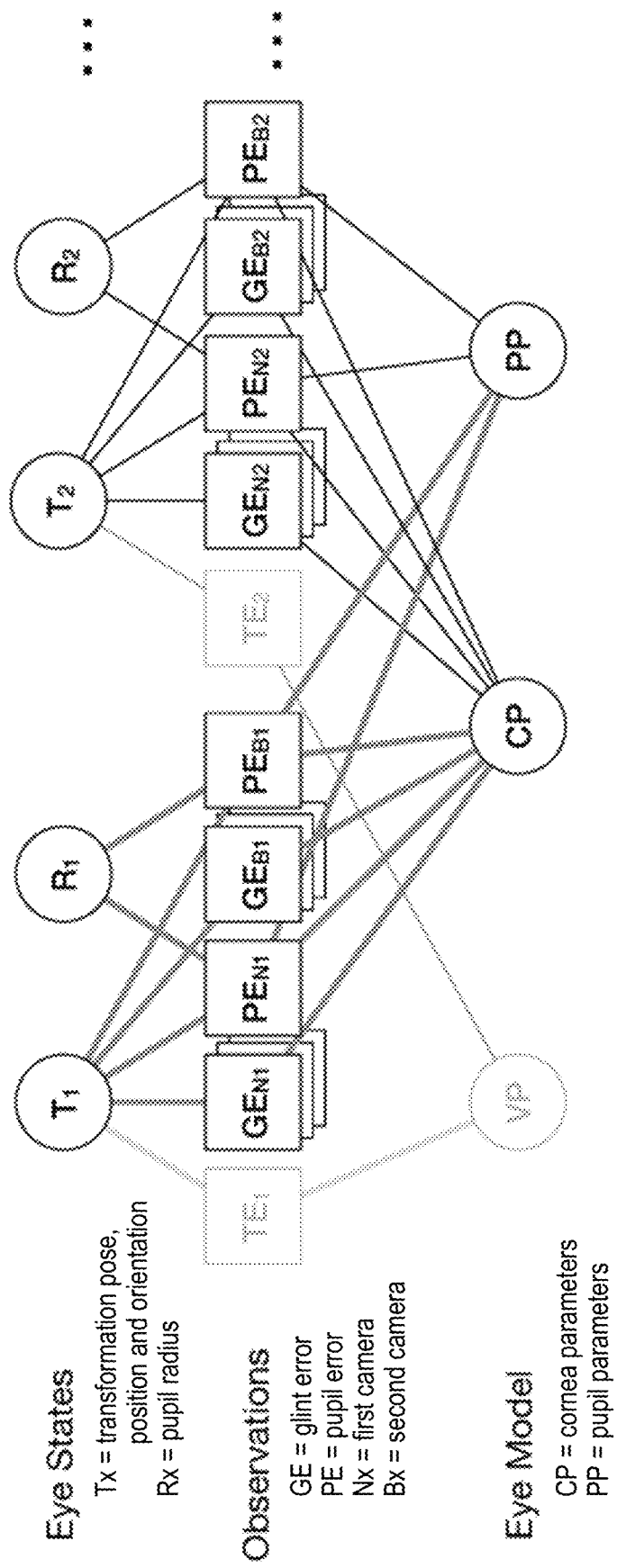
FIG. 7 is a factor graph further illustrating an enrollment process that does not use ground truth target positions, according to some embodiments.

FIG. 7 is a factor graph further illustrating an enrollment process that does not use ground truth target positions as illustrated in FIG. 3 or 4, according to some embodiments. In contrast to the factor graph of FIG. 6, there are no ground truth target positions, and thus no target errors or visual axis parameters. In this process, two cameras are used to capture images of the user's eye at different orientations and at different levels of brightness. The top row of circles represent eye states, with Tx representing transformation pose, position and orientation and Rx representing pupil radius for a given observation. The row of rectangles represent observations, with GE representing glint error and PE representing pupil error for a given observation x from a first camera N and a second camera B. The bottom row of circles represent the eye model, with CP representing cornea parameters and PP representing pupil parameters.

Example Systems

Figure 9A:
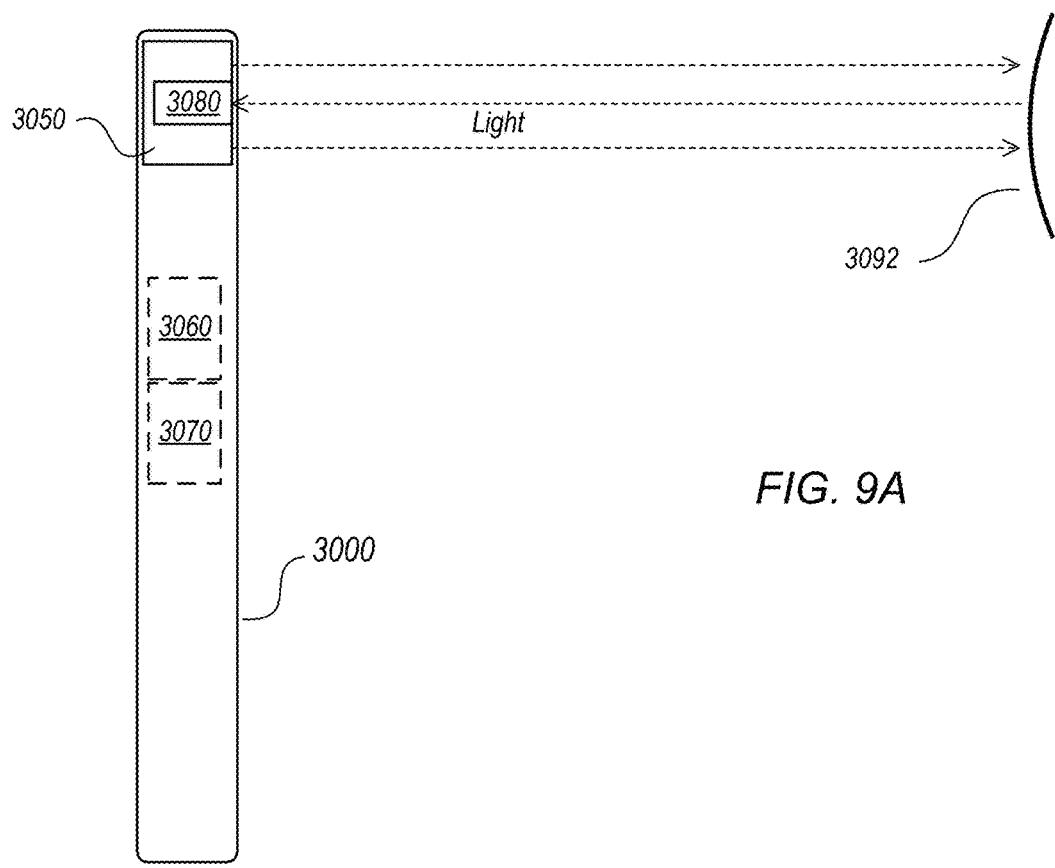
FIGS. 9A and 9B are block diagrams illustrating a device that may include components and implement methods as illustrated in FIGS. 1 through 8, according to some embodiments.
Figure 9B:
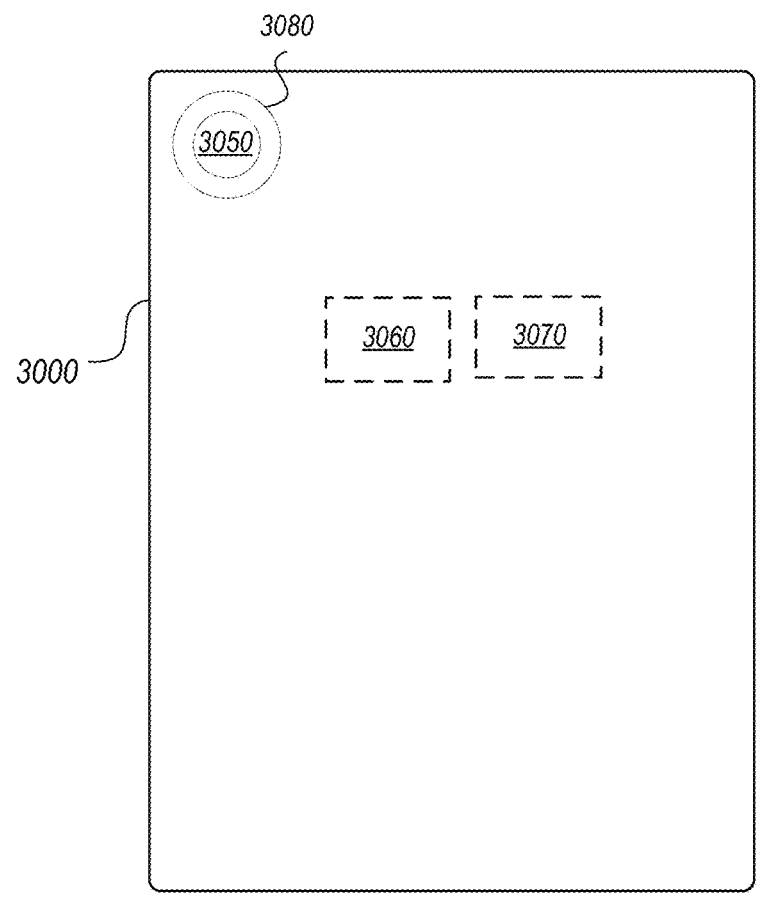

FIGS. 9A and 9B are block diagrams illustrating a device that may include components and implement methods as illustrated in FIGS. 1 through 8, according to some embodiments. An example application of the methods for user eye model enrollment as described herein is in a handheld device 3000 such as smartphone, pad, or tablet. FIG. 9A shows a side view of an example device 3000, and FIG. 9B shows an example top view of the example device 3000. Device 3000 may include, but is not limited to, a display screen (not shown), a controller 3060 comprising one or more processors, memory 3070, pose, motion, and orientation sensors (not shown), and one or more cameras or sensing devices such as visible light cameras and depth sensors (not shown). A camera 3080 and illumination source 3050 may be attached to or integrated in the device 3000, and the device 3000 may be held and positioned by the user so that the camera 3080 can capture image(s) of the user's eye while illuminated by the illumination source 3050. The captured images may, for example, be processed by controller 3060 to generate a user eye model. The user eye model may then be used in another process such as gaze tracking or biometric authentication.

Note that device 3000 as illustrated in FIGS. 9A and 9B is given by way of example, and is not intended to be limiting. In various embodiments, the shape, size, and other features of a device 3000 may differ, and the locations, numbers, types, and other features of the components of a device 3000 may vary.

Figure 10:
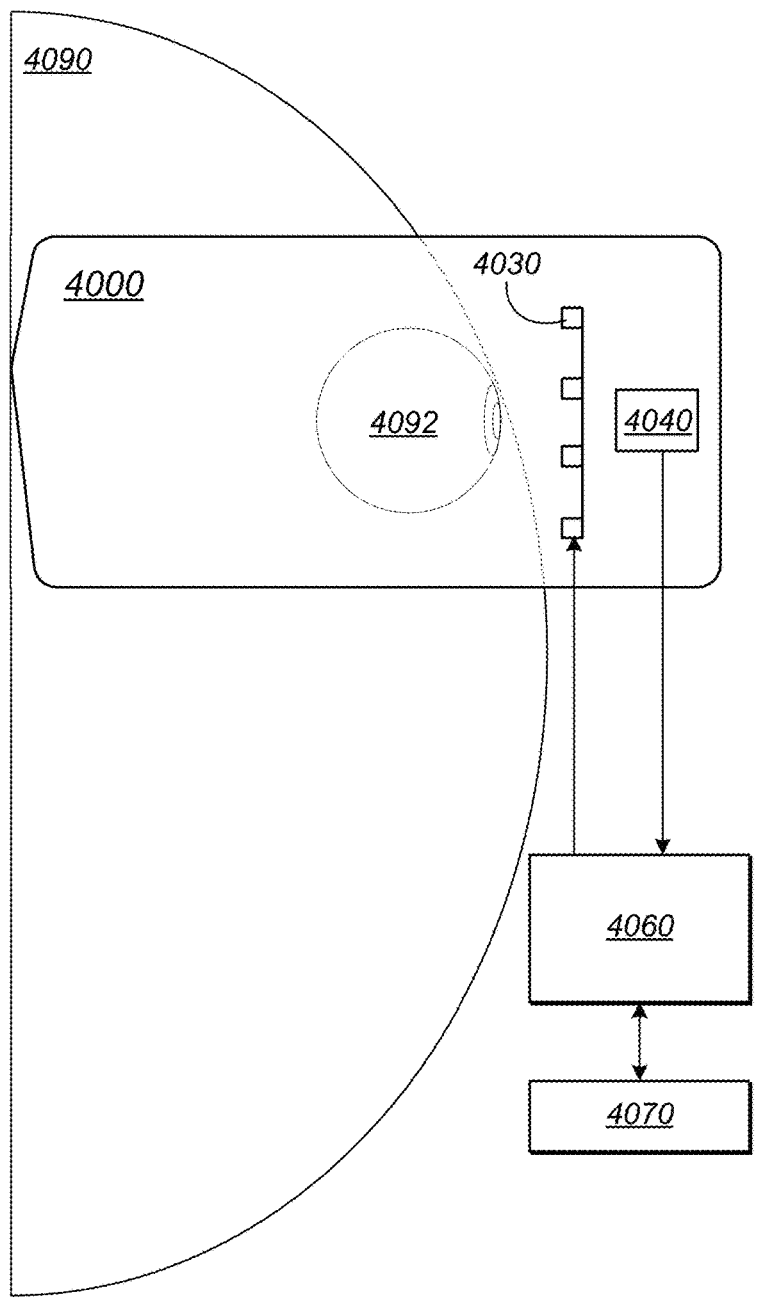
FIG. 10 illustrates an example head-mounted device (HMD) that may include components and implement methods as illustrated in FIGS. 1 through 8, according to some embodiments.

FIG. 10 illustrates an example head-mounted device (HMD) that may include components and implement methods as illustrated in FIGS. 1 through 8, according to some embodiments. The HMD 4000 may, for example be a component in a mixed or augmented reality (MR) system. Note that HMD 4000 as illustrated in FIG. 10 is given by way of example, and is not intended to be limiting. In various embodiments, the shape, size, and other features of an HMD 4000 may differ, and the locations, numbers, types, and other features of the components of an HMD 4000 may vary. In some embodiments, HMD 4000 may include, but is not limited to, a display and two optical lenses (eyepieces) (not shown), mounted in a wearable housing or frame. As shown in FIG. 10, HMD 4000 may be positioned on the user's head 4090 such that the display is disposed in front of the user's eyes 4092. The user looks through the eyepieces onto the display. HMD 4000 may also include sensors that collect information about the user's environment (video, depth information, lighting information, etc.) and about the user (e.g., eye tracking sensors). The sensors may include, but are not limited to one or more eye cameras 4040 (e.g., infrared (IR) cameras) that capture views of the user's eyes 4092, one or more scene (visible light) cameras (e.g., RGB video cameras) that capture images of the real world environment in a field of view in front of the user (not shown), and one or more ambient light sensors that capture lighting information for the environment (not shown).

Figure 11:
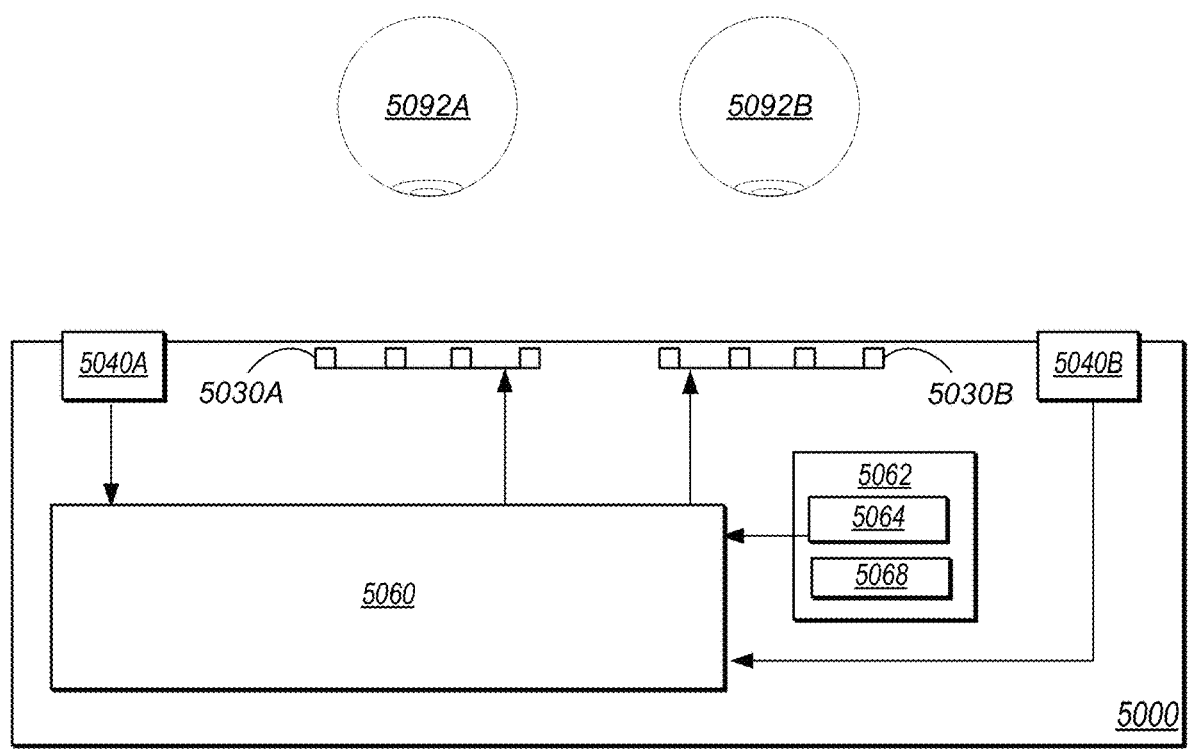
FIG. 11 is a block diagram illustrating an example system that may include components and implement methods as illustrated in FIGS. 1 through 8, according to some embodiments.

A controller 4060 for the MR system may be implemented in the HMD 4000, or alternatively may be implemented at least in part by an external device 4070 (e.g., a computing system) that is communicatively coupled to HMD 4000 via a wired or wireless interface. Controller 4060 may include one or more of various types of processors, image signal processors (ISPs), graphics processing units (GPUs), coder/decoders (codecs), and/or other components for processing and rendering video and/or images. Controller 4060 may render frames (each frame including a left and right image) that include virtual content based at least in part on inputs obtained from the sensors, and may provide the frames to the display. FIG. 11 further illustrates components of an HMD and MR system, according to some embodiments.

In some embodiments, an imaging system for the MR system may include, but is not limited to, one or more eye cameras 4040 and an IR light source 4030. IR light source 4030 (e.g., IR LEDs) may be positioned in the HMD 4000 (e.g., around the eyepieces, or elsewhere in the HMD 4000) to illuminate the user's eyes 4092 with IR light. At least one eye camera 4040 (e.g., an IR camera, for example a 400×400 pixel count camera or a 600×600 pixel count camera, that operates at 850 nm or 940 nm, or at some other IR wavelength or combination of wavelengths, and that captures frames, for example at a rate of 60-120 frames per second (FPS)), is located at each side of the user 4090's face. In various embodiments, the eye cameras 4040 may be positioned in the HMD 4000 on each side of the user 4090's face to provide a direct view of the eyes 4092, a view of the eyes 4092 through the eyepieces, or a view of the eyes 4092 via reflection off hot mirrors or other reflective components. Note that the location and angle of eye camera 4040 is given by way of example, and is not intended to be limiting. While FIG. 10 shows a single eye camera 4040 located on each side of the user 4090's face, in some embodiments there may be two or more eye cameras 4040 on each side of the user 4090's face.

A portion of IR light emitted by light source(s) 4030 reflects off the user's eyes 4092 and is captured by the eye cameras 4040 to image the user's eyes 4092. Images captured by the eye cameras 4040 may be analyzed by controller 4060 to detect features (e.g., pupil and cornea features), position, and movement of the user's eyes 4092, and/or to detect other information about the eyes 4092 such as pupil dilation. An enrollment process as described herein may be executed by controller 4060 to generate models of the user's eyes. The eye models may then be used in other processes. For example, the point of gaze on the display may be estimated from eye tracking information using the eye models; the estimated point of gaze may be used to cause the scene camera(s) of the HMD 4000 to expose images of a scene based on a region of interest (ROI) corresponding to the point of gaze. As another example, the estimated point of gaze may enable gaze-based interaction with content shown on the display. As another example, in some embodiments, brightness of the displayed images may be modulated based on the user's pupil dilation as determined by the imaging system. The HMD 4000 may implement one or more of the methods as illustrated in FIGS. 1 through 8 to capture and process images of the user's eyes 4092 and generate eye models based on the captured images.

Embodiments of an HMD 4000 as illustrated in FIG. 10 may, for example, be used in augmented or mixed (AR) applications to provide augmented or mixed reality views to the user 4090. HMD 4000 may include one or more sensors, for example located on external surfaces of the HMD 4000, which collect information about the user 4090's external environment (video, depth information, lighting information, etc.); the sensors may provide the collected information to controller 4060 of the MR system. The sensors may include one or more visible light cameras (e.g., RGB video cameras) that capture video of the user's environment that may be used to provide the user 4090 with a virtual view of their real environment. In some embodiments, video streams of the real environment captured by the visible light cameras may be processed by the controller 4060 of the HMD 4000 to render augmented or mixed reality frames that include virtual content overlaid on the view of the real environment, and the rendered frames may be provided to the HMD 4000's display system.

FIG. 11 is a block diagram illustrating an example MR system that may include components and implement methods as illustrated in FIGS. 1 through 8, according to some embodiments. In some embodiments, a MR system may include an HMD 5000 such as a headset, helmet, goggles, or glasses. HMD 5000 may implement any of various types of display technologies. For example, the HMD 5000 may include a display system that displays frames including left and right images on screens or displays (not shown) that are viewed by a user through eyepieces (not shown). The display system may, for example, be a DLP (digital light processing), LCD (liquid crystal display), or LCOS (liquid crystal on silicon) technology display system. To create a three-dimensional (3D) effect in a 3D virtual view, objects at different depths or distances in the two images may be shifted left or right as a function of the triangulation of distance, with nearer objects shifted more than more distant objects. Note that other types of display systems may be used in some embodiments.

In some embodiments, HMD 5000 may include a controller 5060 configured to implement functionality of the MR system and to generate frames (each frame including a left and right image) that are provided to the HMD's displays. In some embodiments, HMD 5000 may also include a memory 5062 configured to store software (code 5064) of the MR system that is executable by the controller 5060, as well as data 5068 that may be used by the MR system when executing on the controller 5060. In some embodiments, HMD 5000 may also include one or more interfaces (e.g., a Bluetooth technology interface, USB interface, etc.) configured to communicate with an external device via a wired or wireless connection. In some embodiments, at least a part of the functionality described for the controller 5060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 5060 may be a uniprocessor system including one processor, or a multiprocessor system including several processors (e.g., two, four, eight, or another suitable number). Controller 5060 may include central processing units (CPUs) configured to implement any suitable instruction set architecture, and may be configured to execute instructions defined in that instruction set architecture. For example, in various embodiments controller 5060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. In some embodiments, controller 5060 may be implemented as a system on a chip (SoC). For example, in some embodiments, processors, memory, I/O interface (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture. Controller 5060 may employ any microarchitecture, including scalar, superscalar, pipelined, superpipelined, out of order, in order, speculative, non-speculative, etc., or combinations thereof. Controller 5060 may include circuitry to implement microcoding techniques. Controller 5060 may include one or more processing cores each configured to execute instructions. Controller 5060 may include one or more levels of caches, which may employ any size and any configuration (set associative, direct mapped, etc.). In some embodiments, controller 5060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 5060 may include one or more other components for processing and rendering video and/or images, for example image signal processors (ISPs), coder/decoders (codecs), etc.

Memory 5062 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 5000 may include one or more sensors that collect information about the user's environment (video, depth information, lighting information, etc.). The sensors may provide the information to the controller 5060 of the MR system. In some embodiments, the sensors may include, but are not limited to, visible light cameras (e.g., video cameras) and ambient light sensors.

HMD 5000 may be positioned on the user's head such that the displays and eyepieces are disposed in front of the user's eyes 5092A and 5092B. IR light sources 5030A and 5030B (e.g., IR LEDs) may be positioned in the HMD 5000 (e.g., around the eyepieces, or elsewhere in the HMD 5000) to illuminate the user's eyes 5092A and 5092B with IR light. Eye cameras 5040A and 5040B (e.g., IR cameras, for example 400×400 pixel count cameras or 600×600 pixel count cameras that operate at 850 nm or 940 nm, or at some other IR wavelength, and that capture frames, for example at a rate of 60-120 frames per second (FPS)), may be located at each side of the user's face. In various embodiments, the eye cameras 5040 may be positioned in the HMD 5000 to provide a direct view of the eyes 5092, a view of the eyes 5092 through the eyepieces 5020, or a view of the eyes 5092 via reflection off hot mirrors or other reflective components. Note that the location and angle of eye cameras 5040A and 5040B is given by way of example, and is not intended to be limiting. In some embodiments, there may be a single eye camera 5040 located on each side of the user's face. In some embodiments, there may be two or more eye cameras 5040 on each side of the user's face. For example, in some embodiments, a wide-angle camera 5040 and a narrower-angle camera 5040 may be used on each side of the user's face. A portion of IR light emitted by light sources 5030A and 5030B reflects off the user's eyes 5092A and 5092B is received at respective eye cameras 5040A and 5040B, and is captured by the eye cameras 5040A and 5040B to image the user's eyes 5092A and 5092B. Eye information captured by the cameras 5040A and 5040B may be provided to the controller 5060. The controller 5060 may analyze the eye information (e.g., images of the user's eyes 5092A and 5092B) to determine eye position and movement and/or other features of the eyes 5092A and 5092B. In some embodiments, to accurately determine the location of the user's eyes 5092A and 5092B with respect to the eye cameras 5040A and 5040B, the controller 5060 may perform a 3D reconstruction using images captured by the eye cameras 5040A and 5040B to generate 3D models of the user's eyes 5092A and 5092B. The 3D models of the eyes 5092A and 5092B indicate the 3D position of the eyes 5092A and 5092B with respect to the eye cameras 5040A and 5040, which, for example, allows eye tracking algorithms executed by the controller to accurately track eye movement. The HMD 5000 may implement one or more of the methods as illustrated in FIGS. 1 through 8 to capture and process images of the user's eyes 5090 and generate the eye models based on the captured images.

The eye information obtained and analyzed by the controller 5060 may be used by the controller in performing various VR or AR system functions. For example, the point of gaze on the displays may be estimated from images captured by the eye cameras 5040A and 5040B and the eye models; the estimated point of gaze may be used to cause the scene camera(s) of the HMD 5000 to expose images of a scene based on a region of interest (ROI) corresponding to the point of gaze. As another example, the estimated point of gaze may enable gaze-based interaction with virtual content shown on the displays. As another example, in some embodiments, brightness of the displayed images may be modulated based on the user's pupil dilation as determined by the imaging system.

In some embodiments, the HMD 5000 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by MR system and composited with the displayed view of the user's real environment.

Embodiments of the HMD 5000 as illustrated in FIG. 11 may also be used in virtual reality (VR) applications to provide VR views to the user. In these embodiments, the controller 5060 of the HMD 5000 may render or obtain virtual reality (VR) frames that include virtual content, and the rendered frames may be displayed to provide a virtual reality (as opposed to mixed reality) experience to the user. In these systems, rendering of the VR frames may be affected based on the point of gaze determined from the imaging system.

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

Various embodiments as described herein are reflected in the following clauses:

Clause 1. A system, comprising:
one or more cameras configured to capture images of an eye;
a display; and
a controller comprising one or more processors configured to:
modulate brightness of the display while the one or more cameras are capturing a first set of images of the eye, wherein modulating the brightness is performed to stimulate changes in pupil diameter;
cause a prompt to be displayed on the display, wherein the prompt provides an instruction to look in a different direction; and
generate an eye model based on the first set of images and a second set of images captured while the eye is looking in the different direction.

Clause 2. The system as recited in clause 1, wherein, to generate an eye model, the controller is further configured to:
determine two or more eye poses from the first and second set of images, wherein an eye pose indicates a current eye location and orientation with respect to the one or more cameras; and
calculate eye features based at least in part on the two or more eye poses, wherein the eye features include cornea contour and pupil features;
wherein the eye model is generated based on the calculated eye features.

Clause 3. The system as recited in clause 2, wherein the prompt is displayed at two or more known target positions, and wherein the known target positions are used in determining the one or more eye poses.

Clause 4. The system as recited in clause 1, wherein the controller is further configured to apply the eye model in a gaze tracking process in which features of the eye are derived from one or more images of the eye captured by the one or more cameras and a gaze direction is estimated based on the derived features and the eye model.

Clause 5. The system as recited in clause 4, wherein the controller is further configured to:

receive feedback from the gaze tracking process indicating an error rate; and upon determining that the error rate is over a threshold, update the eye model based on one or more additional images of the eye captured by the one or more cameras.

Clause 6. The system as recited in clause 1, wherein the system is a head-mounted device (HMD), a handheld device, or a wall-mounted device.

The present technology may gather and use data from various sources to generate an eye model and/or perform a gaze tracking process. This data, in some instances, may include personal information data that uniquely identifies a specific individual. This personal information data may include location-based data, demographic data, data or records associated with a user's health or fitness level (e.g., information associated with vital signs, medication, exercise, and the like), date of birth, or other personal or identifying information.

It is recognized that, in some instances, such personal information data may be used to benefit users. For example, the personal information data may be used to improve accuracy of gaze tracking to an improved user visual experience.

It is contemplated that the collection, disclosure, transfer, analysis, storage, or other use of personal information data should comply with well-established privacy policies or practices. Privacy policies and practices that are generally recognized as meeting or exceeding industry or governmental requirements for maintaining personal information data private and secure should be implemented and consistently used. These policies should be easily accessible and updated as the collection or use of the personal information data changes. Personal information data should be collected for legitimate and reasonable uses and not shared or sold outside of those legitimate uses. The collection or sharing should occur after receipt of the user's informed consent. Additional steps to safeguard and secure access to personal information data and to ensure that others with access to the personal information data adhere to their privacy policies and procedures should be considered. An evaluation by third parties to certify adherence to well-established privacy policies and practices may be performed. Policies and practices should be tailored to the particular types of personal information data being collected or accessed and adapted to applicable laws and standards, including jurisdiction-specific considerations. For example, the collection of or access to certain health data in the US may be governed by federal or state laws, such as the Health Insurance Portability and Accountability Act (HIPAA); whereas the collection of or access to the same health data may be subject to other regulations and policies in other countries. As such, different privacy practices should be implemented for different types of personal information data in each country.

It is contemplated that, in some instances, users may selectively prevent the use of, or access to, personal information data. Hardware or software features may be provided to prevent or block access to personal information data. For example, the present technology may be configured to allow users to "opt in" or "opt out" of the collection of personal information data during setup or anytime thereafter. In another example, users can select not to provide personal data with which images capture by the described technology could be associated. In yet another example, users can select to limit use of such personal data and/or images. The present technology may also provide notifications relating to the access or use of personal information data. For example, a first notification may be provided in response to a user downloading an app that may access the user's personal information data and a second notification may be provided to remind the user just before the app accesses the personal information data.

Personal information data should be managed and handled to reduce the risk of unintentional or unauthorized access or use. Risk can be reduced by limiting the collection of data and deleting the data once it is no longer needed. When applicable, data de-identification may be used to protect a user's privacy. For example, de-identification may be performed by removing specific identifiers, controlling the specificity or amount of data stored (e.g., collecting home location data at a city level instead of at an address level), controlling how data is stored (e.g., aggregate data across multiple users), or other techniques.

Although the present technology may broadly include the use of personal information data, it may be implemented without accessing such personal information data. In other words, the present technology may not be rendered inoperable due to the lack of some or all of such personal information data. For example, the technology can generate an eye model and/or perform a gaze tracking process based on non-personal information data, a reduced amount of personal information data, or publicly available information, such that any images or eye models are not accessible by others in a way that could be associated with a specific user.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more cameras configured to capture images of an eye, comprising a pupil;

a controller comprising one or more processors configured to:
  determine two or more eye poses from two or more images of the eye in different orientations captured by the one or more cameras, wherein the two or more images are captured at different levels of brightness, and wherein an eye pose indicates a current eye location and orientation with respect to the one or more cameras;
  calculate eye features based at least in part on the two or more eye poses, wherein the eye features include pupil features, wherein the pupil features change based on the different levels of brightness;
  generate or update an eye model based on the calculated eye features, wherein the eye model comprises estimates of the pupil in multiple degrees of freedom; and
  apply the eye model in a gaze tracking process in which features of the eye are derived from one or more images of the eye captured by the one or more cameras and a gaze direction is estimated based on the derived features and the eye model.

2. The system as recited in claim 1, further comprising a display, wherein the controller is further configured to modulate brightness of the display while the one or more cameras are capturing the two or more images of the eye in different orientations with respect to the one or more cameras, wherein modulating the brightness is performed to stimulate changes in pupil diameter.

3. The system as recited in claim 1, further comprising a display, wherein the controller is further configured to cause a prompt to be displayed on the display, wherein the prompt provides an instruction to look in two or more different directions so that the one or more cameras capture the two or more images of the eye in different orientations with respect to the one or more cameras.

4. The system as recited in claim 3, wherein the prompt is displayed at two or more known target positions, and wherein the known target positions are used in determining the one or more eye poses.

5. The system as recited in claim 1, wherein the controller is further configured to:
  receive feedback from the gaze tracking process indicating an error rate; and
  upon determining that the error rate is over a threshold, update the eye model based on one or more additional images of the eye captured by the one or more cameras.

6. The system as recited in claim 1, wherein, to generate or update the eye model based on the calculated eye features, the controller is configured to apply an optimization process to two or more observations of the eye, each observation corresponding to one or more images captured by the one or more cameras at different orientations.

7. The system as recited in claim 1, wherein there are two cameras each configured to capture a separate image of the eye at each orientation.

8. The system as recited in claim 1, further comprising an illumination source comprising a plurality of light-emitting elements configured to emit light towards the eye to be imaged by the camera.

9. The system as recited in claim 8, wherein the light-emitting elements include light-emitting diodes (LEDs).

10. The system as recited in claim 8, wherein the light-emitting elements include infrared (IR) light sources, and wherein the one or more cameras are infrared cameras.

11. The system as recited in claim 1, wherein the system is a head-mounted device (HMD), a handheld device, or a wall-mounted device.

12. A method, comprising:
  performing, by a controller comprising one or more processors:
    determining two or more eye poses from two or more images of an eye, comprising a pupil, in different orientations, wherein the images are captured by one or more cameras, wherein the two or more images are captured at different levels of brightness, and wherein an eye pose indicates a current eye location and orientation with respect to the one or more cameras;
    calculating eye features based at least in part on the two or more eye poses, wherein the eye features include pupil features, wherein the pupil features change based on the different levels of brightness;
    generating or updating an eye model based on the calculated eye features, wherein the eye model comprises estimates of the pupil in multiple degrees of freedom; and
    applying the eye model in a gaze tracking process in which features of the eye are derived from one or more images of the eye captured by the one or more cameras and a gaze direction is estimated based on the derived features and the eye model.

13. The method as recited in claim 12, further comprising modulating brightness of a light source while the one or more cameras are capturing the two or more images of the eye in different orientations with respect to the one or more cameras, wherein modulating the brightness stimulates changes in pupil diameter.

14. The method as recited in claim 12, further comprising causing a visible prompt to be displayed, wherein the prompt provides an instruction to look in two or more different directions so that the one or more cameras capture the two or more images of the eye in different orientations with respect to the one or more cameras.

15. The method as recited in claim 14, wherein the prompt is displayed at two or more known target positions, and wherein the known target positions are used in determining the one or more eye poses.

16. The method as recited in claim 12, further comprising:
  receiving feedback from the gaze tracking process indicating an error rate; and
  upon determining that the error rate is over a threshold, updating the eye model based on one or more additional images of the eye captured by the one or more cameras.

17. The method as recited in claim 12, wherein generating or updating the eye model based on the calculated eye features comprises applying an optimization process to two or more observations of the eye, each observation corresponding to one or more images captured by the one or more cameras at different orientations.

18. The method as recited in claim 12, further comprising capturing via two cameras a separate image of the eye at each orientation.

19. The method as recited in claim 12, further comprising emitting, by an illumination source comprising a plurality of infrared (IR) light-emitting diodes (LEDs), light towards the eye to be imaged by the one or more cameras, and wherein the one or more cameras are infrared cameras.

20. The method as recited in claim 12, wherein the one or more cameras and controller are components of a head-mounted device (HMD), a handheld device, or a wall-mounted device.

* * * * *